United States Patent
Chuprov et al.

(10) Patent No.: US 8,127,367 B2
(45) Date of Patent: Feb. 28, 2012

(54) REFRESHING SOFTWARE LICENSES

(75) Inventors: Dmitry Vladislavovich Chuprov, Saint Petersburg (RU); Vladimir Eduardovich Shmakov, Saint Petersburg (RU)

(73) Assignee: Dmvich Software, LLC, Wilmington, DE (US)

( * ) Notice: Subject to any disclaimer, the term of this patent is extended or adjusted under 35 U.S.C. 154(b) by 965 days.

(21) Appl. No.: 12/052,652

(22) Filed: Mar. 20, 2008

(65) Prior Publication Data

US 2008/0285758 A1   Nov. 20, 2008

Related U.S. Application Data

(60) Provisional application No. 60/918,898, filed on Mar. 20, 2007.

(51) Int. Cl.
| | |
|---|---|
| G06F 17/30 | (2006.01) |
| G06F 21/00 | (2006.01) |
| G06F 21/24 | (2006.01) |
| G06F 7/04 | (2006.01) |
| H04L 9/00 | (2006.01) |
| H04L 9/08 | (2006.01) |
| G06F 1/00 | (2006.01) |
| G06F 21/22 | (2006.01) |
| H04N 1/00 | (2006.01) |
| H04N 7/167 | (2006.01) |

(52) U.S. Cl. .................. 726/27; 726/7; 726/18; 726/19; 705/59; 380/240; 380/278

(58) Field of Classification Search .................... 726/27, 726/18, 19, 7; 380/278; 705/59
See application file for complete search history.

(56) References Cited

U.S. PATENT DOCUMENTS

2001/0011253 A1    8/2001   Coley
(Continued)

FOREIGN PATENT DOCUMENTS

EP   1865656 A1   12/2007
(Continued)

OTHER PUBLICATIONS

David W. Kravitz, Thomas S. Messerges; "Achieving media portability through local content translation and end-to-end rights management"; Nov. 2005 DRM '05: Proceedings of the 5th ACM workshop on Digital rights management Publisher: ACM; pp. 27-36.*
Schneier, B., "Applied Cryptography, Protocols, Algorithms, and Source Code in C," John Wiley & Sons, New York, 1996, Chap. 3, "Basic Protocols," pp. 47-65, and Chap. 24, "Example Implementations," pp. 566-572.

(Continued)

*Primary Examiner* — Matthew Smithers
*Assistant Examiner* — Courtney Fields (57) ABSTRACT

A license access agent is configured to execute on a client computer. The license access agent comprises a license manager configured to receive a software license upon a request for authorizing usage of a protected software product so as to allow one or more functionalities of the protected software product to run on the client computer. The license manager is configured to disable the protected software product upon expiration of the software license unless the license manager obtains a refreshed software license.

30 Claims, 8 Drawing Sheets

U.S. PATENT DOCUMENTS

| | | |
|---|---|---|
| 2003/0110375 A1 | 6/2003 | Colvin |
| 2003/0147536 A1 | 8/2003 | Andivahis |
| 2005/0060569 A1 | 3/2005 | Uesugi |
| 2005/0125684 A1 | 6/2005 | Schmidt |
| 2005/0251489 A1* | 11/2005 | Coley et al. .................. 705/59 |

FOREIGN PATENT DOCUMENTS

| | | |
|---|---|---|
| JP | 2002-297255 | 10/2002 |
| WO | WO 9915947 A1 * | 4/1999 |
| WO | 2004049137 A2 | 6/2004 |
| WO | 2005053254 A1 | 6/2005 |

OTHER PUBLICATIONS

EP Communication issued in European Patent Application No. 08744127.5 and dated May 31, 2010.

International Search Report and Written Opinion issued in PCT/US2008/057693 and mailed on Jul. 8, 2008.

International Preliminary Report on Patentability for PCT/US2008/057693 issued Sep. 22, 2009.

Office Action issued in Japanese Patent Application No. 2009-554747 and dated Nov. 8, 2011.

* cited by examiner

REFRESHING SOFTWARE LICENSES

CROSS-REFERENCE TO A RELATED APPLICATION

This application claims the benefit of U.S. Provisional Application No. 60/918,898, filed Mar. 20, 2007, which is incorporated herein by reference in its entirety.

BACKGROUND

Efforts by software manufacturers to enforce software licenses have not been entirely satisfactory to date. Unauthorized users or "pirates" cause great harm to the software marketplace in which significant economic investments in developing software may not result in sufficient authorized users.

BRIEF DESCRIPTION OF THE DRAWINGS

The foregoing aspects and many of the attendant advantages of the disclosed subject matter will become more readily appreciated as the same become better understood by reference to the following detailed description, when taken in conjunction with the accompanying drawings, wherein.

DETAILED DESCRIPTION

Embodiments of the present disclosure comprise systems, methods, and computer-readable media suitable for initially providing a software license to enable a protected software product to execute, thereby allowing access to its functionality, and thereafter periodically or nonperiodically refreshing the software license if properly authorized. In embodiments of the present disclosure, a license system producer helps generate a license verifying program. This license verifying program is incorporated within the protected software product by a vendor. The vendor may then distribute this protected software product to a client. If properly authorized, the license verifying program on behalf of the client contacts and verifies a license server which validates or refreshes the software license and enables the functionality of the protected software product.

In embodiments of the present disclosure, the software license contains data that enables functionality of the protected software product. In one embodiment, data in the software license enables some program functionality, and in other embodiments, data in the software licenses enables all program functionality. In another embodiment, the protected software product comprises multiple features, some of which are operable without a software license, and some of which are operable with a software license. In an embodiment, the data in the software license enables additional features beyond those that are operable without a software license.

In one embodiment, a software license is associated with a license packet which contains pieces of information. These pieces of information may include a serial number of the software license, a digital signature, a user identifier associated with the software license, a listing of program features enabled by the software license, and so on. In some embodiments, these additional pieces of information may include information that can identify a client computer without intervention by a user, such as an electronic serial number which uniquely characterizes the hardware configuration of the client computer, a network card address, and so on. In embodiments where the various pieces of information are included in a license packet, a license server may store one or more pieces of information to reduce unauthorized use of the protected software product. For example, using additional pieces of information, a determination is made whether a software license associated with a particular electronic serial number has been installed on more than one client computer or by more than one user. Information identifying an installation of a protected software product could also include an installation date or a random number generated at the time of installation. In some embodiments, the software license is stored by the license server without the additional information before the license packet is generated, as opposed to the software license and the additional information, which advantageously conserves storage space.

Figure 1:
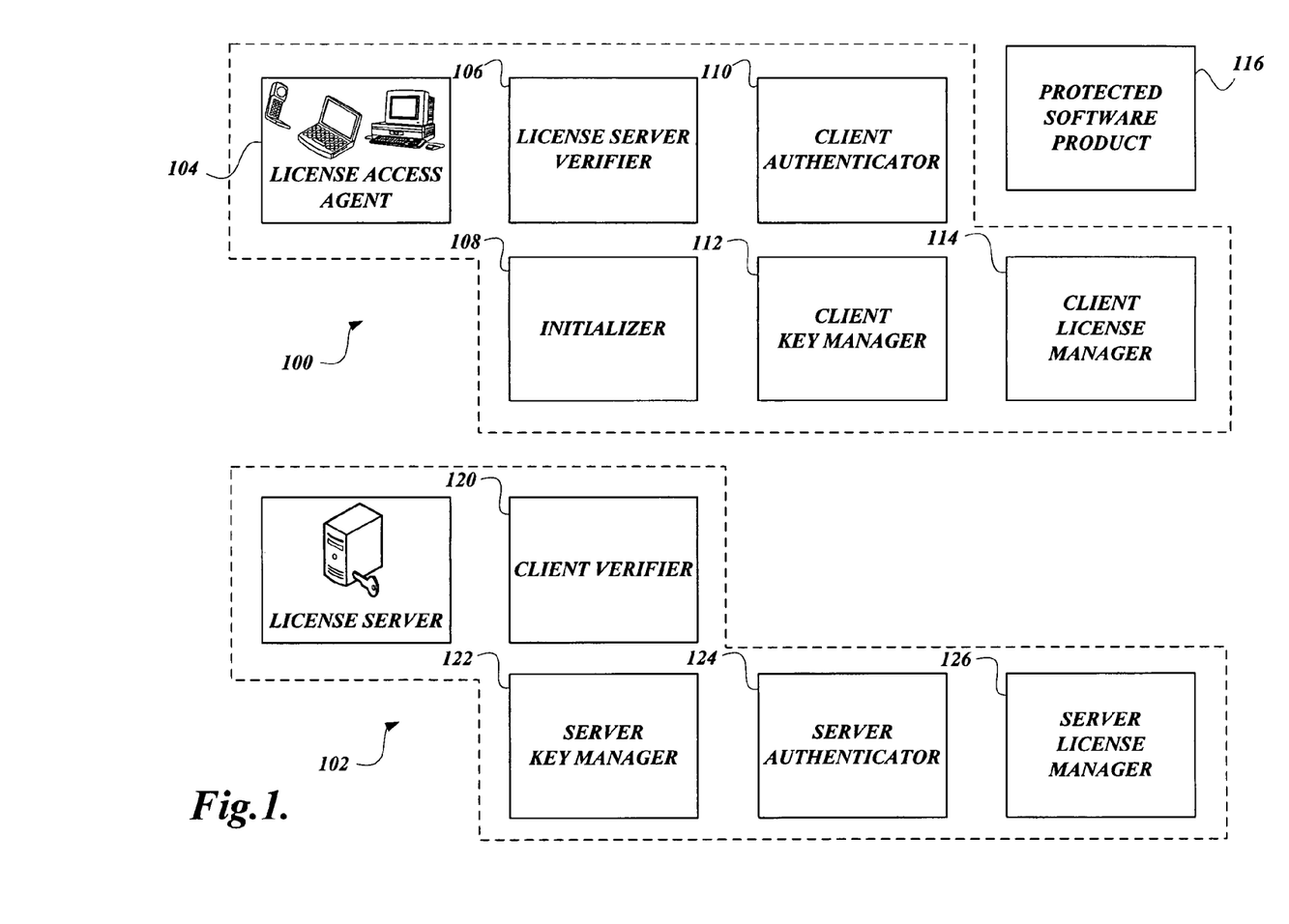
FIG. 1 is a block diagram illustrating an exemplary license access agent and an exemplary license server for refreshing software licenses according to various embodiments of the present disclosure.

FIG. 1 depicts a client computer 100 and a license server 102. The client computer 100 may take many different forms. For example, one suitable form of the client computer 100 may be a general purpose desktop computer, while another suitable form of the client computer 100 may be a mobile phone, a laptop computer, a PDA, a video game console, and so on. The client computer 100 has installed upon it a license access agent 104, which is used to enable functionality in a protected software product 116.

Embodiments of the present disclosure facilitate verification of both the client computer 100 and the license server 102, thereby preventing a pirate from illicitly obtaining a software license by counterfeiting either a request from the client computer 100 or a response from the license server 102. To that end, the license access agent 104 comprises a license server verifier 106 that is configured to verify the identity of a license server 102.

The license server 102 also comprises a client verifier 120, which serves to verify the client computer 100 upon receipt of a license request. The client verifier 120 may verify the client computer 100 upon receipt of the license request by using a client identifier and initial key, and matching them to information stored in a database communicatively coupled to the client verifier 120. In some embodiments of the license access agent 104, an initializer 108 establishes this initial connection with the license server 102 and submits the license request.

Embodiments of the present disclosure facilitate authentication of both the client computer 100 and the license server 102, in addition to verification. Whereas the previously described verification features allow for the client computer 100 and the license server 102 to determine whether the respective client computer 100 and license server 102 are authorized to do what they are attempting to do, the client authenticator 110 and the server authenticator 124 further allow some embodiments to at least substantially ensure that the client computer 100 and the license server 102 are the parties that they claim to be, often by using cryptographic techniques.

The license access agent 104 further comprises a client key manager 112 configured to store at least two client session keys, including a previous session key and a current session key. These keys are updated upon each communication to the license server 102 in one embodiment, but in other embodiments these keys may be updated less frequently. In this way, the client computer 100 can keep track of multiple different communication sessions with the license server 102 to refresh the software license in a secure manner. The storing of the previous session key also provides reliability. For example, the license access agent 104 and the license server 102 can securely communicate even if there is a fault in one of the rounds of communication (such as a failure to properly update the keys) between the license access agent 104 and the license server 102.

The license access agent 104 further comprises a client license manager 114, which is configured, upon receipt of the software license from the license server 102, to install or enable the protected software product 116 on the client's computer. Upon expiration of a license interval, some embodiments of the client license manager 114 are configured to cause the initializer 108 to communicate to the license server 102 using the updated session keys and updated session identifier stored by the client computer 100 in order to refresh the license. The software license received by the client license manager 114 is generated by a server license manager 126 upon receipt of confirmation from the client computer 100 that a session key has been received.

The license server 102 further comprises a server key manager 122 and the server license manager 126. A session means the inclusion of a logical grouping of otherwise separate communications between the license server 102 and the client computer 100. The server key manager 122 is configured to generate a new session key during each current session for use during the next session. In one embodiment, the server key manager 122 is further operable to store an association between a client identifier and a current session key for use in future sessions. The server license manager 126 is configured to generate software licenses and license packets in response to a license request from the client computer 100.

Figure 2:
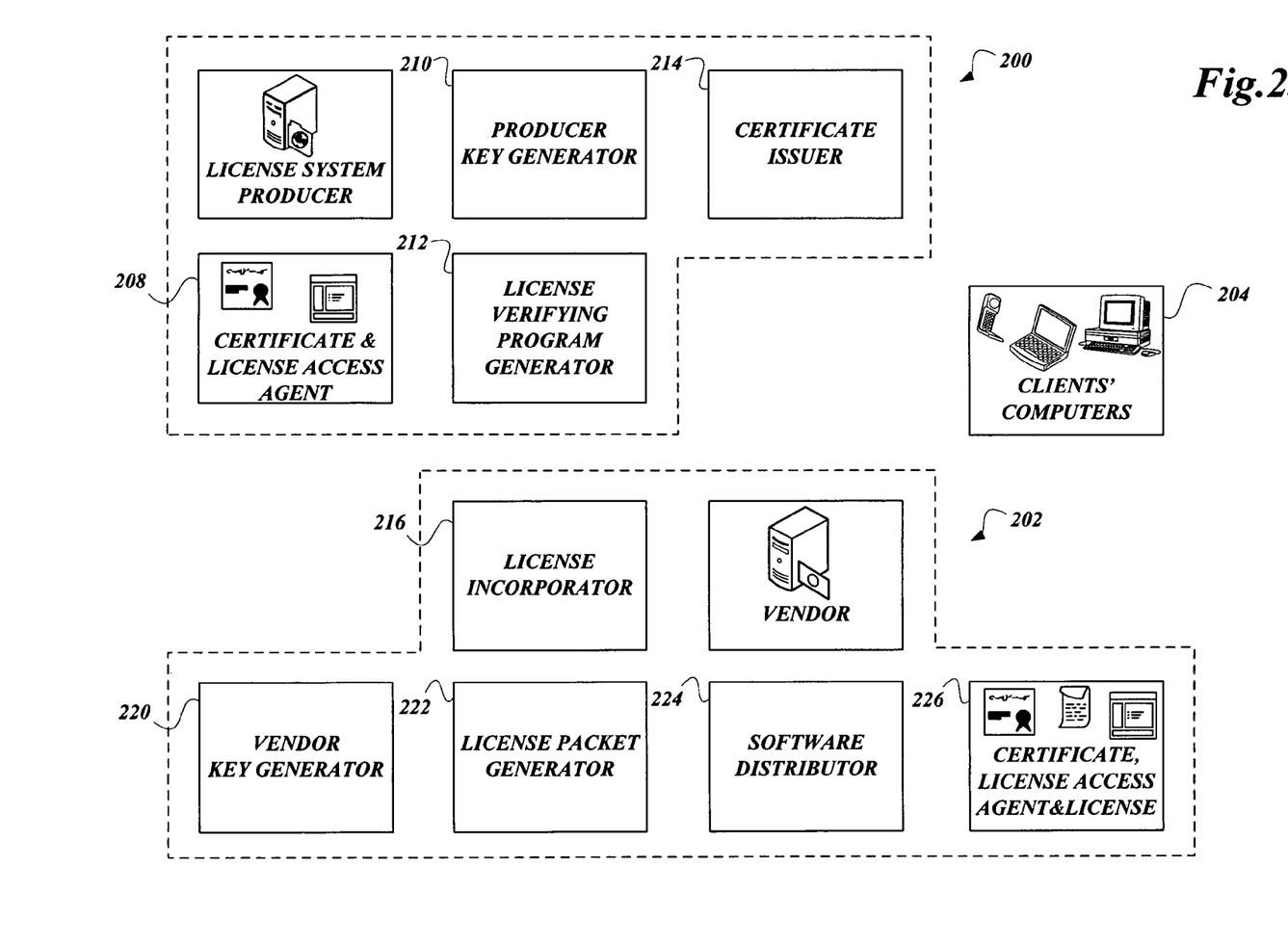
FIG. 2 is a block diagram illustrating an exemplary license system producer, an exemplary vendor, and exemplary client computers for obtaining software licenses according to various embodiments of the present disclosure.

FIG. 2 depicts one embodiment of a system that allows a license system producer 200 to act as a trusted third party between a client computer 204 and a vendor 202, in which the vendor 202 is attempting to distribute a protected software product. The client computer 204 represents a computer, such as the client computer 100. One problem faced in the past by software vendors attempting to design effective licensing schemes for their software is the complexity of building such a scheme from the ground up. As depicted in FIG. 2, the vendor 202, using an embodiment of the present disclosure, need not create their own licensing scheme, and instead incorporate a license verifying program generated by the license system producer 200 to protect their software product. One embodiment of a license verifying program includes the license access agent 104, and one embodiment of the vendor 202 comprises the license server 102.

The license system producer 200 comprises a producer key generator 210, a certificate issuer 214, and a license verifying program generator 212. The license system producer 200 creates a certificate and license access agent 208 to be used by the vendor 202. One embodiment of the vendor 202 comprises a license incorporator 216, a vendor key generator 220, a license packet generator 222, and a software distributor 224. The license system producer 200 uses these components to incorporate a certificate and license access agent 208 into a protected software product, and produce a certificate, license access agent, and license 226 for licensing the protected software product, and thereafter refreshing the software license.

To allow the client computers 204 to verify the identity of the vendor 202, the vendor key generator 220 generates a public/private key pair including a vendor's public key and vendor's private key, stores the vendor's private key in a vendor database, and sends the vendor's public key to the license system producer 200 to be registered. In response, the certificate issuer 214 of the license system producer 200 issues a vendor certificate comprising the vendor's public key and a vendor identifier. The license system producer 200 signs the certificate with the license system producer's private master key, and uses the license verifying program generator 212 to generate the license access agent 208.

The certificate and license access agent 208 are sent to the vendor 202. The vendor 202 incorporates the certificate and license access agent 208 created by the license system producer 200 with a software product they wish to protect. To this combination, the vendor 202 adds a license packet generated by the license packet generator 222. The vendor 202 then distributes this combination of certificate, license access agent, and license packet 226, along with the protected software product, to the client computer 204. The protected software product is at least partially disabled until the license access agent 208 is used by the client computer 204 to enable the license and protected software product. Also, the license and protected software product, after enablement, ceases to function after a given period of time unless refreshed by the client computer 204.

One skilled in the art will appreciate that although the various components of these systems have been depicted as separate, multiple components may be merged into single components without departing from the scope of claimed subject matter. Also, although various components may be depicted as residing on the same physical hardware, they may reside on separate physical hardware, or may be connected via a network. One skilled in the art will also appreciate that when data such as keys, licenses, or other data are stored, they may be stored in a variety of ways, including in volatile or nonvolatile memory, on removable or nonremovable media, or in a local or remote database.

FIGS. 3A-3F illustrate a method 300 for refreshing software licenses so as to inhibit unauthorized uses. From a start block, the method 300 continues to a set of method steps 304, defined between a continuation terminal ("terminal A") and an exit terminal ("terminal B"). The set of method steps 304 describes a method of licensing software produced by the vendor 202. In this set of method steps 304, the vendor 202 communicates with the license system producer 200 in order to create the certificate, license access agent, and license 226 to be incorporated in the protected software product 116. The set of method steps 304 also performs the initial enablement of the software features for use. From terminal A (FIG. 3B), the method 300 proceeds to block 312, where the vendor key generator 220 generates a private/public key pair. This key pair consists of a private vendor key and a public vendor key, which may be generated by a cryptographic algorithm. Also in block 312, the public vendor key and a vendor identifier are sent to the license system producer 200. The method 300 continues to block 314, where the private vendor key is stored in a vendor's database.

Figure 3A:
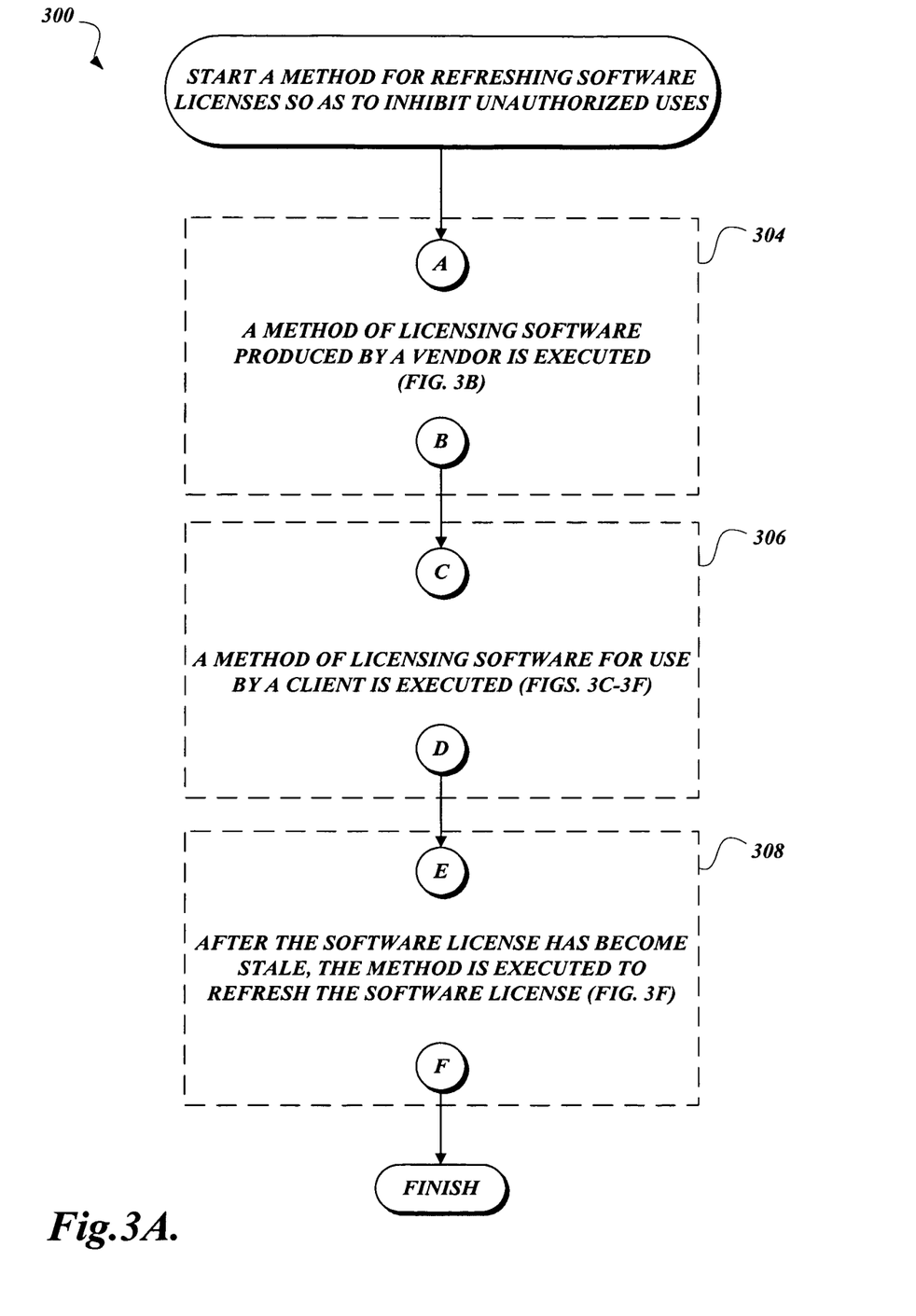
FIGS. 3A-3F are process diagrams illustrating exemplary methods for refreshing software licenses so as to inhibit unauthorized uses in accordance with various embodiments of the present disclosure.
Figure 3B:
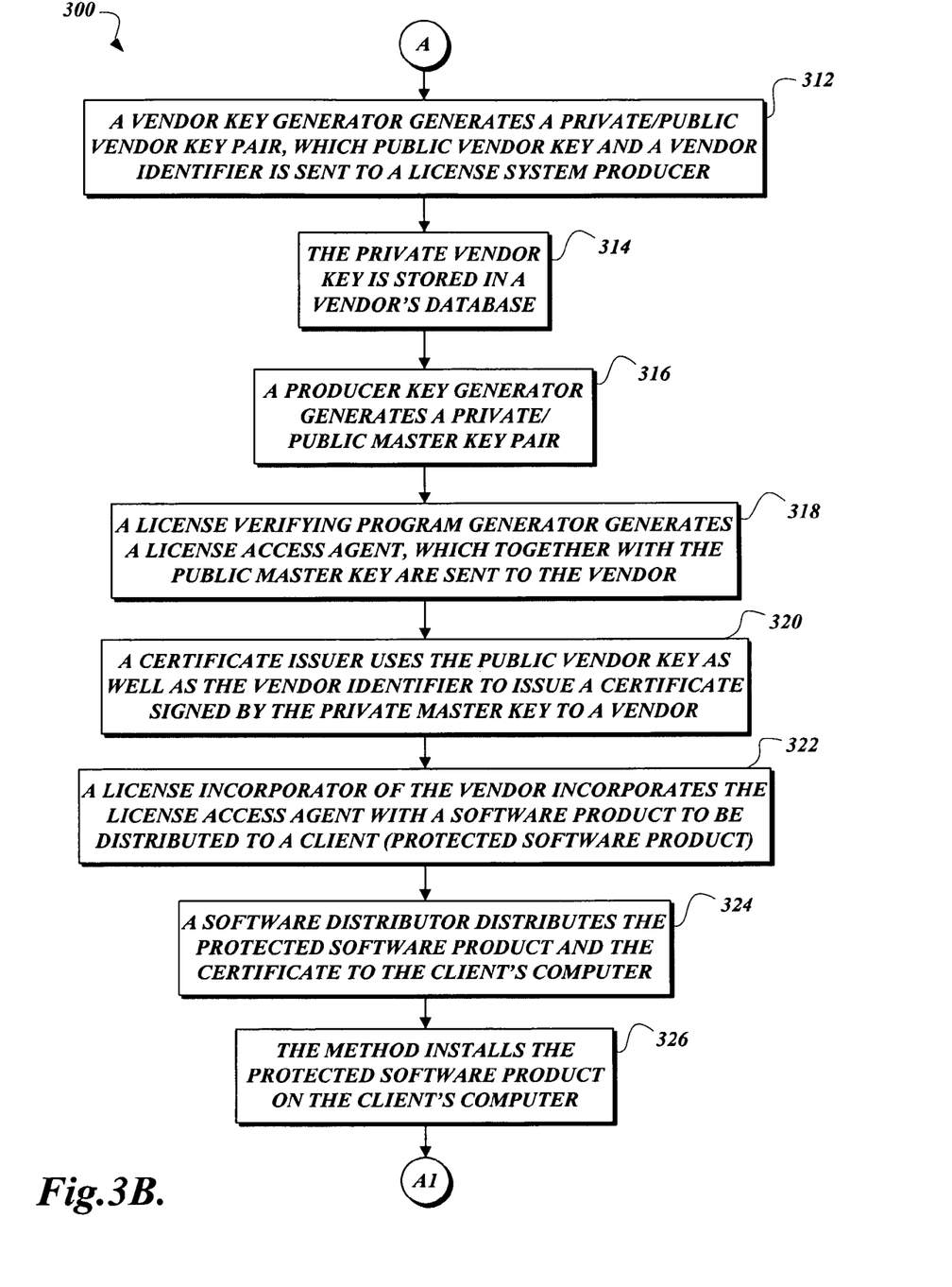

At block 316, the producer key generator 210 generates a private/public key pair, consisting of a private master key and a public master key. Alternatively, the private master key and public master key may have previously been generated and stored by the license system producer 200. Once the private master key and public master key have been obtained, the method 300 continues to block 318, where the license verifying program generator 212 generates the license access agent 104. The license access agent 104 and the public master key are then sent to the vendor 202. The method 300 continues to block 320, where the certificate issuer 214 uses the public vendor key along with the vendor identifier to issue a certificate signed by the private master key, and sends the issued certificate to the vendor 202. Optionally, the license access agent and certificate 208 are combined and sent to the vendor 202 together.

The signing of the certificate by the private master key allows a recipient of the certificate to verify, using the public master key, that the source of the certificate and the contents of the certificate (that is, the public vendor key and the vendor identifier) are genuine. In this way, the client computer 204 verifies the identity of the vendor 202, and the license access agent 104 at least substantially ensures that the vendor 202 it is communicating with is the same vendor 202 that created it and not a malicious third party.

The method 300 then proceeds to block 322, where the license incorporator 216 incorporates the license access agent 104 with a software product to be distributed to a client computer 204. Once incorporated, the software product becomes the protected software product 116. At block 324, the software distributor 224 distributes the protected software product 116 and the certificate to the client computer 204. This distribution could take place via any number of media, including, for example, via direct download over the Internet, via removable storage media such as optical disks or flash memory, or via wireless transmission. Further, the license access agent 104 and the protected software product 116 may be included on the same computer-readable medium, or may be obtained separately. However obtained, successful execution of the license access agent 104 enables functionality of the protected software product 116. The method 300 continues to block 326, where the protected software product 116 is installed on the client computer 204, and then to another continuation terminal ("terminal A1").

From terminal A1 (FIG. 3C), the method 300 proceeds to block 328. At this point, the protected software product 116 has not been enabled. While in some embodiments the protected software product 116 contains a software license, that software license is not yet enabled. In block 328, the protected software product 116 invokes the license access agent 104, which in turn requests a license packet from the vendor 202. The method 300 continues to block 330, where the license packet generator 222 begins the generation of a license packet signed by the private vendor key. The use of the private vendor key for the signature allows the protected software product 116 to verify that the license packet was received from the vendor 202 and allows the method 300 to transmit the license packet to the license access agent 104 securely. The method 300 continues to block 332, where the license packet generator 222 generates a serial number for the protected software and generates an activation key. The method 300 then continues to block 334, where the license packet generator 222 combines the serial number and the activation key to form an initial key for initial access to the protected software product 116. Next, at block 336, the vendor 202 sends the license packet to the client computer 204.

Figure 3C:
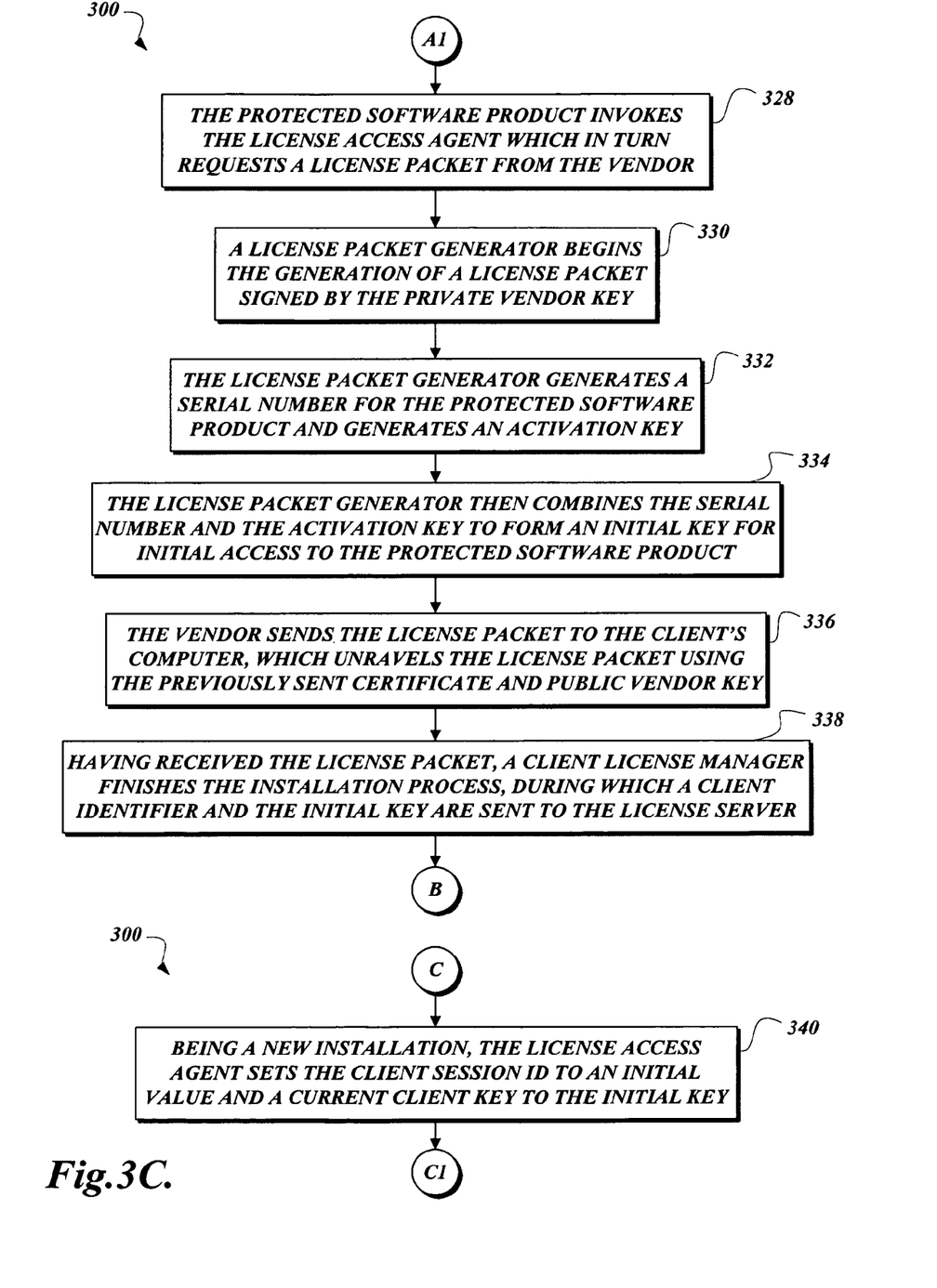

The client computer 204 unravels the license packet and verifies its source using the previously sent certificate and public vendor key. Having received the license packet, the method 300 continues to block 338, where the client license manager 114 finishes the installation process, during which process the client identifier and the initial key are sent to the license server 102. The client identifier and the initial key may be communicated to the client computer 204 either manually or automatically, depending upon the particular application and the configuration of the software. In one embodiment, the client identifier and the initial key are communicated automatically, without user intervention or knowledge. In another embodiment, the client identifier and the initial key are communicated automatically, but the user is notified that the process is occurring. In yet another embodiment, the client identifier and the initial key are input manually. The method 300 then continues to terminal B.

From terminal B (FIG. 3A), the method 300 proceeds to a set of method steps 306 defined between a continuation terminal ("terminal C") and an exit terminal ("terminal D"). The set of method steps 306 depicts a method for licensing software for use by a client. From terminal C (FIG. 3C), the method 300 continues to block 340. The client computer 204 uses a client session ID and a current client key to communicate with the license server 102. As the method 300 depicts a method for licensing a newly installed protected software product 116, in block 340, the license access agent 104 sets the client session ID to an initial value and the current client key to the initial key. The method 300 then continues to another continuation terminal ("terminal C1").

From terminal C1 (FIG. 3D), the method 300 proceeds to block 342, where the license access agent 104 invokes the initializer 108. The initializer 108 connects with the license server 102 to make a license request. This communication from the initializer 108 to the license server 102 contains the client identifier and the initial key. The license server 102 uses this information to verify that the client computer 204 submitting the license request is authorized to obtain a software license. The method 300 continues to block 344, where, having received the license request, the client verifier 120 searches a licensing database to verify the client identifier. The method 300 continues to decision block 346, where a test is performed to determine whether the client identifier is found in the licensing database. If the answer to the test at decision block 346 is NO, the method 300 proceeds to an exit terminal ("terminal F") and terminates. Otherwise, if the answer to the test at decision block 346 is YES, the method 300 proceeds to block 348.

Figure 3D:
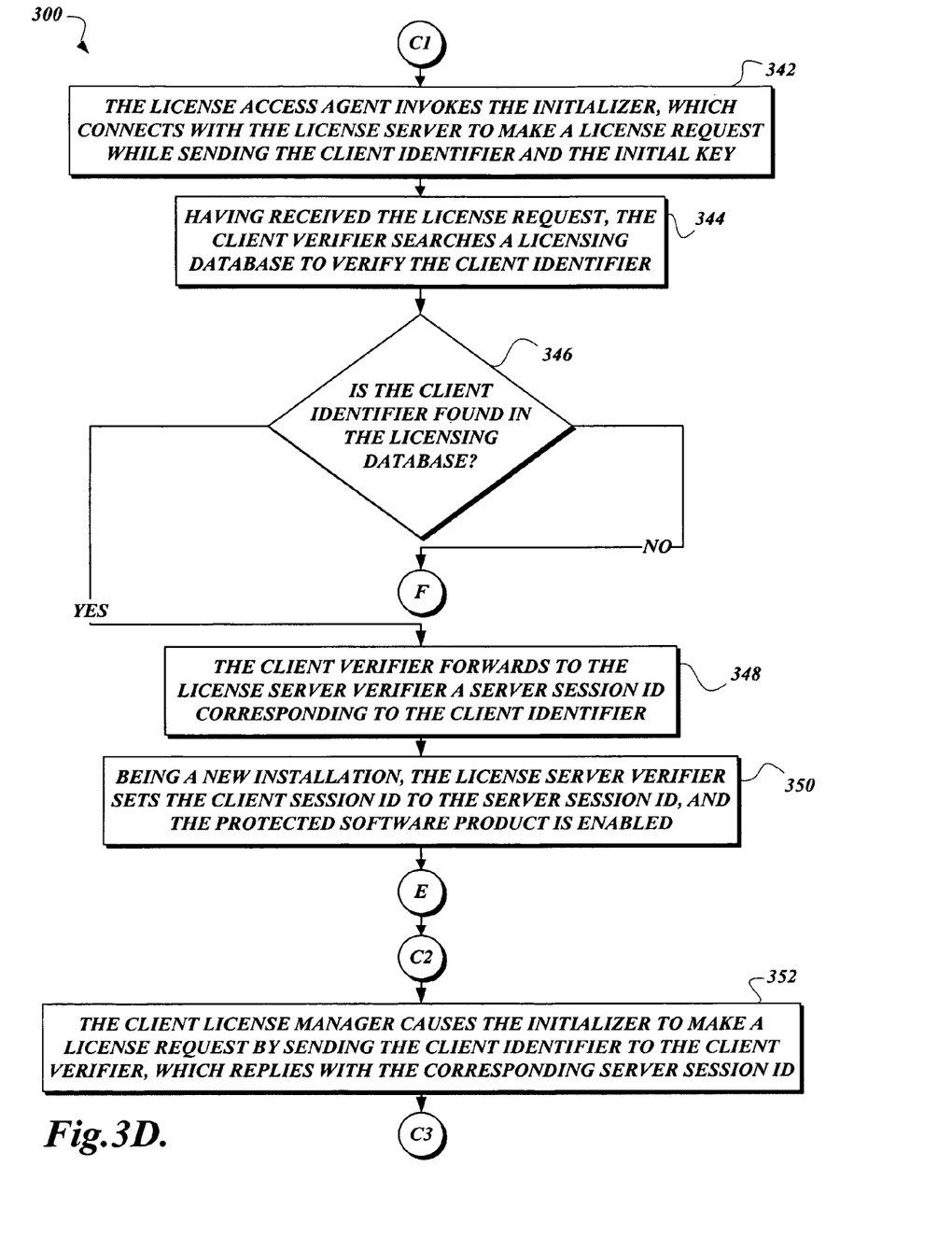
Figure 3E:
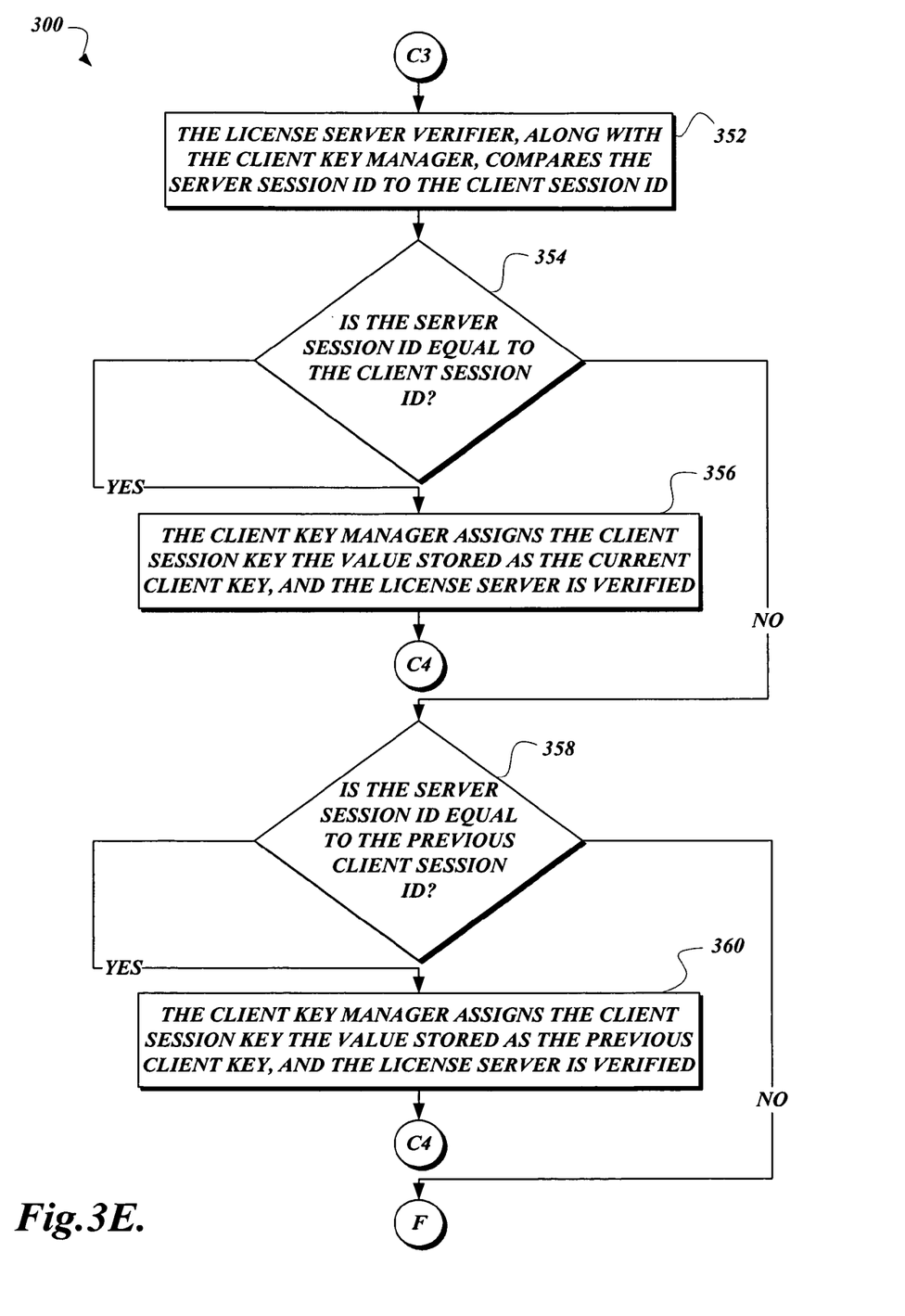

In block 348, the client verifier 120 forwards to the license server verifier 106 a server session ID corresponding to the client identifier. Since this is a new installation, the method 300 proceeds to block 350, where the license server verifier 106 sets the client session ID to the server session ID, and the protected software product is enabled. In one embodiment, the license server 102 communicates the server session ID to the client computer 204 to allow this synchronization. In another embodiment, the server session ID is the same as the initial value of the client session ID, and no further synchronization is appropriate. In yet another embodiment, the server session ID and the client session ID are not preset values, but are instead synchronized by calculating each one using a sequential algorithm guaranteed to produce an identical result for both the license server 102 and the client computer 204.

The method 300 then continues to another continuation terminal ("terminal E") and then another continuation terminal ("terminal C2"). Terminal C2 denotes the end of a set of method steps for initially enabling a protected software product upon installation, and terminal E denotes the beginning of a set of method steps for refreshing a new or stale software license to continue enablement of the protected software product 116.

The first part of the license request involves verifying that the license server to which the license access agent 104 is communicating is, in fact, the correct license server 102. This is done by matching the server session ID stored by the license server 102 to the client session ID stored by the client computer 204—an impostor license server would not be able to supply a matching server session ID. The method 300 proceeds from terminal C2 to block 352, where the client license manager 114 causes the initializer 108 to make a license request by sending the client identifier to the client verifier 120. The client verifier 120 retrieves the server session ID associated with the client identifier and transmits it back to the initializer 108. The method 300 then continues to another continuation terminal ("terminal C3").

From terminal C3 (FIG. 3E), the method 300 proceeds from terminal C3 to block 352, at which the license server verifier 106, along with the client key manager 112, compares the server session ID to the client session ID. In one embodiment, the method 300 proceeds to a decision block 354, where a test is performed to determine whether the server session ID is equal to the client session ID. If the answer to the test at decision block 354 is YES, the method proceeds to block 356, where the client key manager 112 assigns the client session key the value stored as the current client key, the license server 102 is verified, and the method 300 proceeds to another continuation terminal ("terminal C4"). Otherwise, if the answer to the test at decision block 354 is NO, the method 300 proceeds to another decision block 358, where a test is performed to determine whether the server session ID is equal to the previous client session ID (as opposed to the most recent client session ID). If the answer to the test at decision block 358 is YES, the method 300 proceeds to block 360, where the client key manager 112 assigns the client session key the value stored as the previous client key, the license server is verified, and the method 300 proceeds to terminal C4. Otherwise, if the answer to the test at decision block 358 is NO, the license server 102 has failed to be verified, and the method 300 proceeds to terminal F and terminates.

From terminal C4 (FIG. 3F), the method 300 continues to block 352, wherein the client authenticator 110 and the server authenticator 124 authenticate the client computer 204 and the license server 102 using a cryptographic authentication method. In one embodiment, both the client authenticator 110 and the server authenticator 124 encrypt a random number and compare the resulting encrypted data to authenticate each other.

Figure 3F:
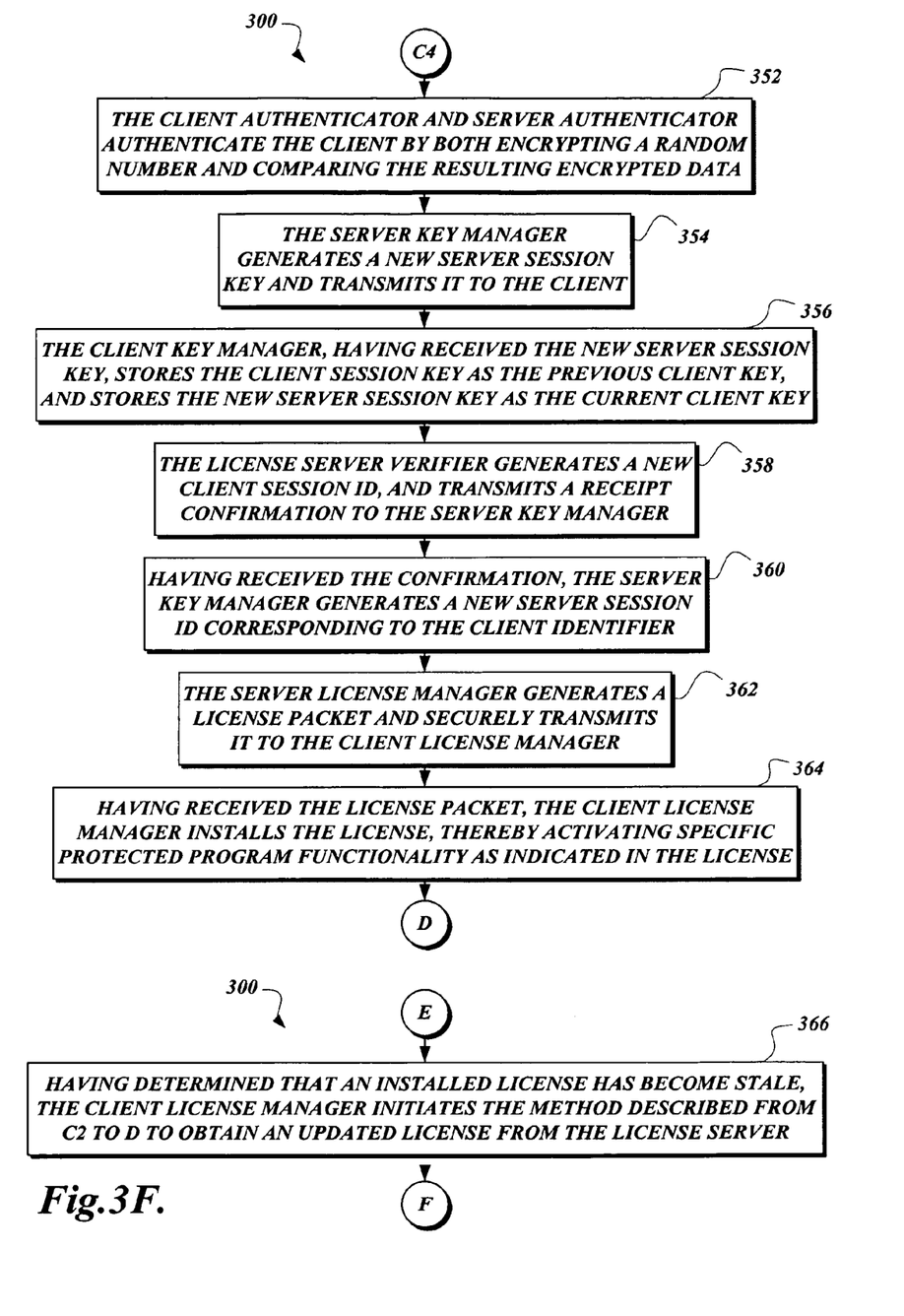

Once the client computer 204 and the license server 102 have been authenticated, the method 300 proceeds to block 354, where the server key manager 122 generates a new server session key and transmits it to the client computer 204. Next, at block 356, the client key manager 112, having received the new server session key, stores the client session key as the previous client key, and stores the new server session key as the current client key. The storing of the client session key as the previous client key, instead of simply replacing the client session key with the new server session key, allows for added reliability. If the client computer 204 and the license server 102 fail to complete the method 306 due to communication or other failures, the client computer 204 and the license server 102 will be able to communicate in the future using the previous client key.

The method 300 then proceeds to block 358, where the license server verifier 106 generates a new client session ID, and transmits a receipt confirmation to the server key manager 122. Next, in block 360, having received the confirmation, the server key manager 122 generates a new server session ID corresponding to the client identifier. In one embodiment, the client session ID and server session ID match, so that upon the next execution of the method 300, the client session ID and server session ID will match. In one embodiment, this is achieved by having the license server 102 communicate the generated server session ID to the client computer 204, which then updates the client session ID to match. In another embodiment, the new server session ID and the new client session ID are generated based on altering the previously matching server session ID and client session ID by the same algorithm, such that the newly generated server session ID and client session ID will match without requiring further communication between the license server 102 and the client computer 204. In yet another embodiment, the client computer 204 generates a new client session ID and transmits it to the license server 102, which then updates the new server session ID to match. In yet another embodiment, the server session ID and client session ID need not be of identical value, but instead may correspond to one another in a suitable way so as to indicate a match.

After the client session ID and the server session ID have been updated, the method 300 proceeds to block 362, where the server license manager 126 generates a license packet and securely transmits it to the client license manager 114. The method 300 then proceeds to block 364, where, having received the license packet, the client license manager 114 installs the software license, thereby enabling specific protected program functionality as indicated in the software license. The method 300 then proceeds to another continuation terminal ("terminal D").

From terminal (FIG. 3A), the method 300 proceeds to a set of method steps 308 defined between terminal E and terminal F. The set of method steps 308 describes that the method refreshes a software license after it has become stale. From terminal E (FIG. 3F), the method 300 proceeds to block 366, where, having determined that a software license has become stale, the client license manager 114 initiates the set of method steps 306 described above from terminal C2 (FIG. 3D) to terminal D (FIG. 3F) to obtain an updated software license from the license server 102. The software license may become stale in many different ways. In one embodiment, the software license becomes stale after a certain time period elapses. In another embodiment, proactive action taken by a license server 102 or vendor 202 may cause a software license on a client computer 204 to become stale. In yet another embodiment, user action (such as repeated use of the protected software product) may cause the software license to become stale.

The functionality of a stale software license may also differ in certain embodiments. In one embodiment, a stale software license does not allow continued program functionality until it is refreshed with the license server 102. In another embodiment, a stale software license allows continued program functionality until a further time period or further number of uses elapses. In yet another embodiment, a stale software license causes a notification to be presented to a user to indicate that the software license requires refreshing.

From block 366, after having executed the set of method steps 308 from terminal C2 to terminal D, the method 300 proceeds to terminal F and terminates.

While illustrative embodiments have been illustrated and described, it will be appreciated that various changes can be made therein without departing from the spirit and scope of claimed subject matter.

What is claimed is:

1. A system, comprising:
 a license access agent configured to execute on a client computer, the license access agent comprising a license manager configured to receive a software license in response to a request for authorizing usage of a protected software product so as to allow one or more functionalities of the protected software product to run on the client computer, the license manager further configured to disable the protected software product upon expiration of the software license unless the license manager obtains a refreshed software license.

2. The system of claim 1, the license access agent further comprising an initializer configured to establish a connection with a license server and further configured to send a request for the software license via the connection, the request comprising a client identifier and an initial key provided in a license packet.

3. The system of claim 1, the license access agent further comprising a license server verifier configured to verify a license server by receiving a server session identifier and comparing the server session identifier to a client session identifier stored on the client computer.

4. The system of claim 1, the license access agent further comprising a client key manager configured to store at least two client session keys, which include a previous session key and a current session key, the previous session key and the current session key being updated upon a communication with a license server.

5. The system of claim 1, the license access agent further comprising a client authenticator configured to authenticate the license access agent executing on the client computer to a license server.

6. The system of claim 1, further comprising a license server configured to execute on a server computer while the license access agent is executed on the client computer, the license server comprising a server license manager configured to generate the software license in a license packet upon receipt of confirmation from the license access agent that a session key has been updated.

7. The system of claim 6, the license server further comprising a client verifier configured to establish a connection with the client computer upon receipt of the request for the software license, the client verifier configured to verify the client computer by a client identifier and forward to the client computer a session identifier corresponding to the client identifier, the client verifier configured to update the session identifier that defines a current session.

8. The system of claim 7, the license server further comprising a server authenticator configured to authenticate the client computer.

9. The system of claim 8, the license server further comprising a server key manager configured to generate a new session key during a current session for use by the server authenticator during a next session, the server key manager configured to forward the new session key to the client computer.

10. A method, comprising:
disabling a protected software product by a license access agent on a client computer upon expiration of a software license unless a refreshed software license is obtained by making a request for a license packet; and
receiving, at the license access agent, the license packet including the refreshed software license so as to allow one or more functionalities of the protected software product to run on the client computer in response to verifying that a client identifier of the client computer is found in a licensing database and verifying that a server session identifier is equal to a client session identifier or a previous session identifier.

11. The method of claim 10, further comprising generating the license access agent by a license system producer.

12. The method of claim 11, further comprising incorporating the license access agent with a software product to be distributed to the client computer to form the protected software product.

13. The method of claim 12, further comprising invoking the license access agent by the protected software product upon execution, thereby causing the license access agent to request the license packet from a vendor.

14. The method of claim 10, further comprising assigning a client session key a value stored as a current client key if the server session identifier is equal to the client session identifier and assigning the client session key a value stored as a previous client key if the server session identifier is equal to the previous client session identifier.

15. The method of claim 14, further comprising:
generating a new server session key and transmitting the new server session key to the client computer by a server key manager;
assigning a new client session key and sending a receipt confirmation to the server key manager by the license server verifier;
generating a new server session identifier corresponding to the client identifier by the server key manager in response to receiving the receipt confirmation; and
generating the license packet by a server license manager.

16. A non-transitory computer-readable medium having computer-executable instructions stored thereon for executing a method for inhibiting unauthorized software usage, the method comprising:
disabling a protected software product upon expiration of a software license;
making a request for a license packet;
receiving the license packet containing the refreshed software license so as to allow one or more functionalities of the protected software product to run on a client computer in response to verifying that a client identifier of the client computer is found in a licensing database and verifying that a server session identifier is equal to either a client session identifier or a previous session identifier; and
enabling the one or more functionalities of the protected software product.

17. The non-transitory computer-readable medium of claim 16, further comprising generating a license access agent by a license system producer, wherein the disabling the protected software product and the enabling the one or more functionalities of the protected software product are performed by the license access agent.

18. The non-transitory computer-readable medium of claim 17, further comprising incorporating the license access agent with a software product to be distributed to the client computer to form the protected software product.

19. The non-transitory computer-readable medium of claim 16, further comprising assigning a client session key a value stored as a current client key if the server session identifier is equal to the client session identifier and assigning the client session key a value stored as a previous client key if the server session identifier is equal to the previous client session identifier.

20. The non-transitory computer-readable medium of claim 19, further comprising generating the license packet by a server license manager after a server key manager generates a new server session key and transmits the new server session key to the client computer, after a new client session key is assigned by the license server verifier, after a receipt confirmation is sent to the server key manager, and after the server key manager generates a new server session identifier corresponding to the client identifier in response to receiving the receipt confirmation.

21. A system comprising:
a license server configured to execute on a server computer, the license server comprising a server license manager configured to:
- receive a request for a software license for authorizing usage of a protected software product from a license access agent at a client computer, wherein the request includes a client identifier associated with the client computer;
- in response to verification that the client identifier of the client computer is found in a licensing database and that a server session identifier is equal to a client session identifier or a previous session identifier, generate the software license in a license packet; and
- send the software license to the license access agent at the client computer to allow one or more functionalities of the protected software product to run on the client computer.

22. The system of claim 21, wherein the license server further comprises a server authenticator configured to authenticate the client computer.

23. The system of claim 22, wherein the license server further comprises a server key manager configured to generate a new session key during a current session for use by the server authenticator during a next session, and wherein the server key manager is further configured to forward the new session key to the client computer.

24. The system of claim 21, wherein the license server further comprises a client verifier configured to establish a connection with the client computer upon receipt of the request for the software license, wherein the client verifier is further configured to verify the client computer by the client identifier, forward to the client computer a session identifier corresponding to the client identifier, and update the session identifier that defines a current session.

25. A method comprising:
- receiving, at a license server on a server computer, a request for a software license for authorizing usage of a protected software product from a license access agent at a client computer, wherein the request includes a client identifier associated with the client computer;
- in response to verification that the client identifier of the client computer is found in a licensing database and that a server session identifier is equal to a client session identifier or a previous session identifier, generating the software license in a license packet at the license server; and
- sending the software license from the license server at the server computer to the license access agent at the client computer to allow one or more functionalities of the protected software product to run on the client computer.

26. The method of claim 25, further comprising generating a new session key during a current session for use during a next session, and forwarding the new session key from the server computer to the client computer.

27. The system of claim 21, further comprising:
- establishing a connection with the client computer upon receipt of the request for the software license;
- verifying the client computer at the server computer using the client identifier;
- forwarding from the server computer to the client computer a session identifier corresponding to the client identifier; and
- updating the session identifier that defines a current session.

28. A non-transitory computer-readable medium having computer-executable instructions stored thereon for executing a method for inhibiting unauthorized software usage, the method comprising:
- receiving a request for a software license for authorizing usage of a protected software product from a license access agent at a client computer, wherein the request includes a client identifier associated with the client computer;
- in response to verification that the client identifier of the client computer is found in a licensing database and that a server session identifier is equal to a client session identifier or a previous session identifier, generating the software license in a license packet; and
- sending the software license to the license access agent at the client computer to allow one or more functionalities of the protected software product to run on the client computer.

29. The non-transitory computer-readable medium of claim 28, further comprising generating a new session key during a current session for use during a next session, and forwarding the new session key to the client computer.

30. The non-transitory computer-readable medium of claim 28, further comprising:
- establishing a connection with the client computer upon receipt of the request for the software license;
- verifying the client computer using the client identifier;
- forwarding to the client computer a session identifier corresponding to the client identifier; and
- updating the session identifier that defines a current session.

* * * * *

UNITED STATES PATENT AND TRADEMARK OFFICE
CERTIFICATE OF CORRECTION

PATENT NO.         : 8,127,367 B2                                                                Page 1 of 1
APPLICATION NO.    : 12/052652
DATED              : February 28, 2012
INVENTOR(S)        : Chuprov et al.

It is certified that error appears in the above-identified patent and that said Letters Patent is hereby corrected as shown below:

Column 10, lines 36-37, in Claim 16, delete "to either a client" and insert -- to a client --.

Signed and Sealed this
Twenty-eighth Day of August, 2012

David J. Kappos
*Director of the United States Patent and Trademark Office*